United States Patent [19]

Ballard et al.

[11] Patent Number: 4,896,848
[45] Date of Patent: Jan. 30, 1990

[54] SATELITE TRANSFER VEHICLE

[75] Inventors: David Ballard, Seabrook, Tex.; Denis Lofts, St. Albans, England

[73] Assignee: Scott Science and Technology, Palmdale, Calif.

[21] Appl. No.: 865,731

[22] PCT Filed: Aug. 28, 1985

[86] PCT No.: PCT/US85/01648

§ 371 Date: Jun. 27, 1986

§ 102(e) Date: Jun. 27, 1986

Related U.S. Application Data

[63] Continuation-in-part of Ser. No. 645,911, Aug. 29, 1984, Pat. No. 4,664,343.

[51] Int. Cl.$^4$ ............................................. B64G 1/40
[52] U.S. Cl. ................................ 244/158 R; 244/172
[58] Field of Search ................ 244/158 R, 172, 160, 244/161, 162

[56] References Cited

U.S. PATENT DOCUMENTS 4,273,305  6/1981  Hinds .................................. 244/160
4,326,684  4/1982  Rosen .................................. 244/172
4,664,343  5/1987  Lofts et al. ......................... 244/172

Primary Examiner—Joseph F. Peters, Jr.
Assistant Examiner—Rodney Corl
Attorney, Agent, or Firm—Fulwider, Patton, Rieber, Lee & Utecht

[57] ABSTRACT

A transfer vehicle for use in a system for transferring payloads from an earth-launch vehicle in one space trajectory to another space trajectory. The system includes a space launch vehicle (FIG. 9) with primary propulsion and guidance systems, a transfer vehicle (FIG. 1) carrying a payload which is stowed in the cargo bay during earth-launch and insertion of the earth-launch vehicle into low-earth transfer trajectory. An engine module (FIG. 3) carrie on-board mission equipment, rocket engine, related fuel supply, guidance equipment, attitude control equipment and electrical power supply equipment (FIGS. 11–20). A grapple system on the earth-launch vehicle (FIG. 9) deploys the transfer vehicle and cargo and restows it for on-orbit repair/modification for earth-return. The transfer vehicle may be multi-staged (FIG. 21) and may be provided with multiple engines (FIG. 23).

1 Claim, 11 Drawing Sheets

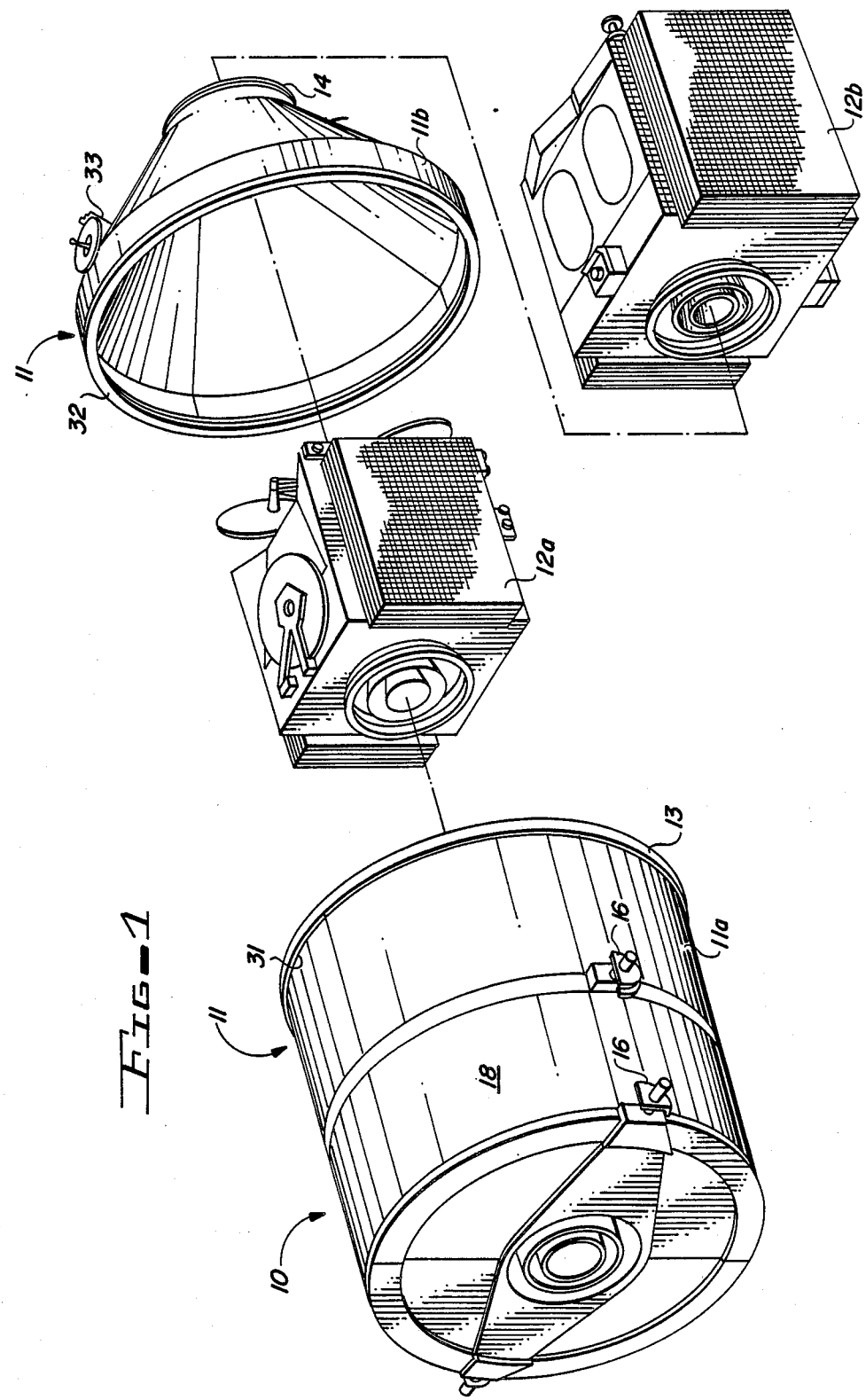

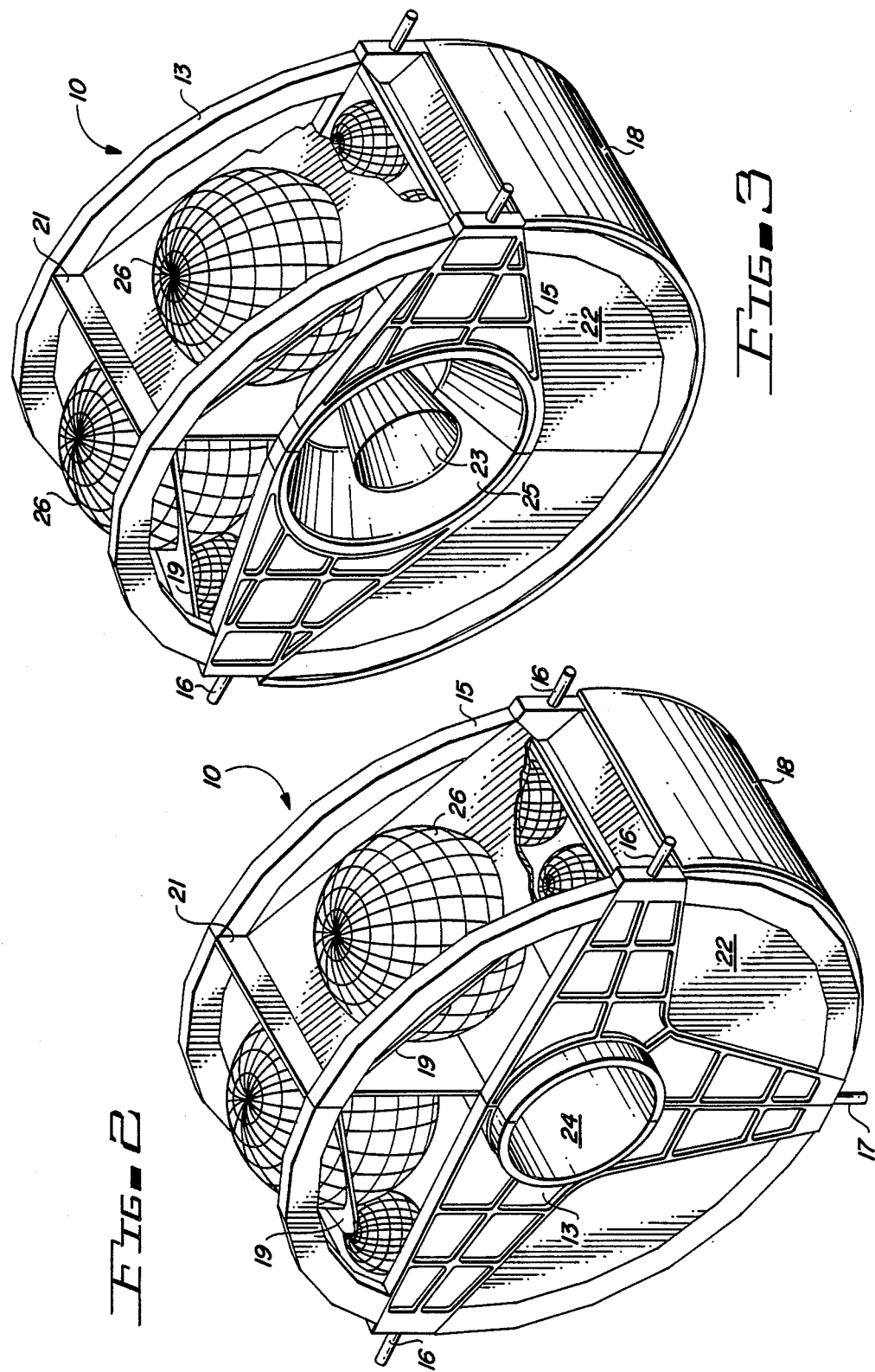

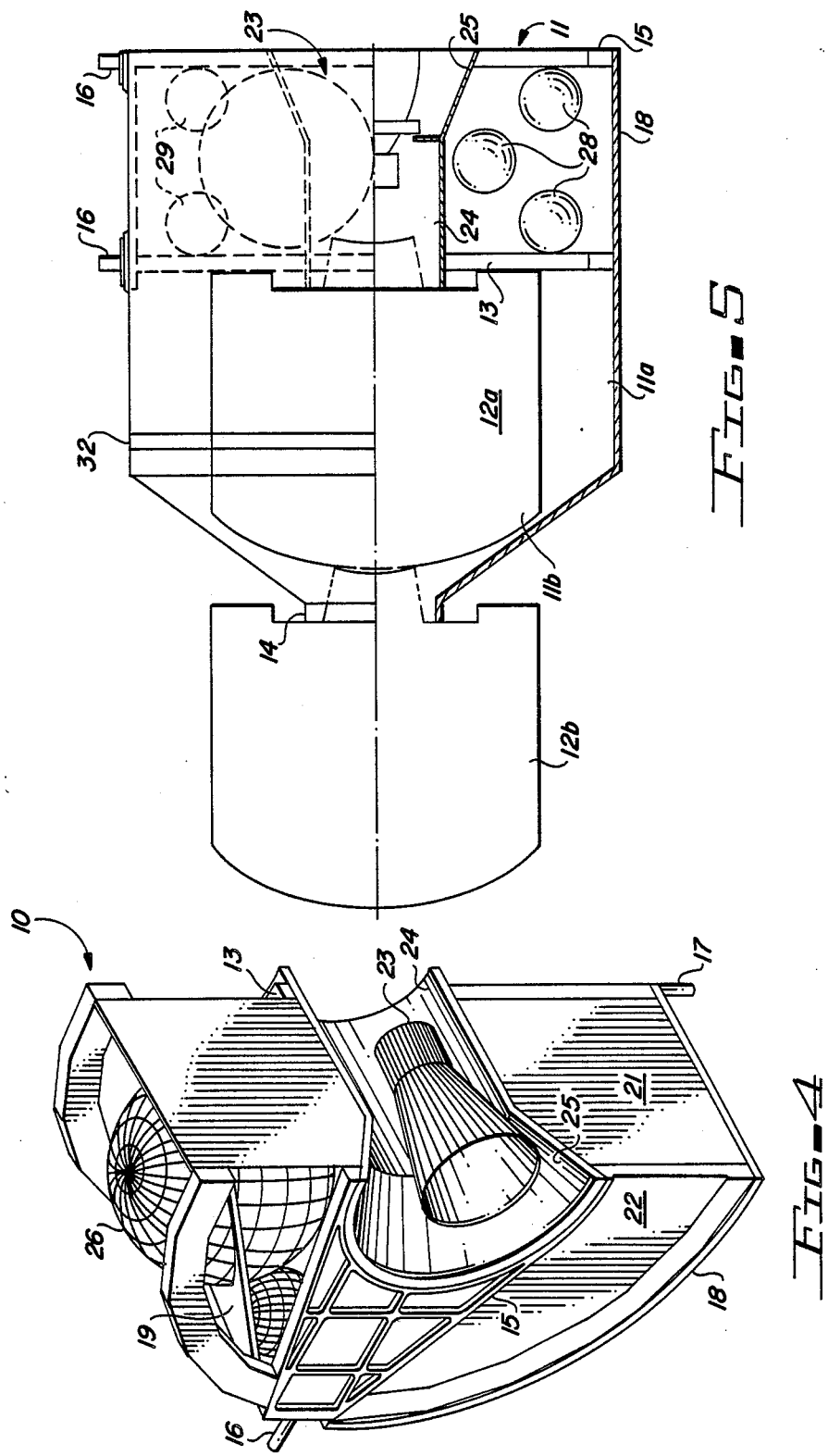

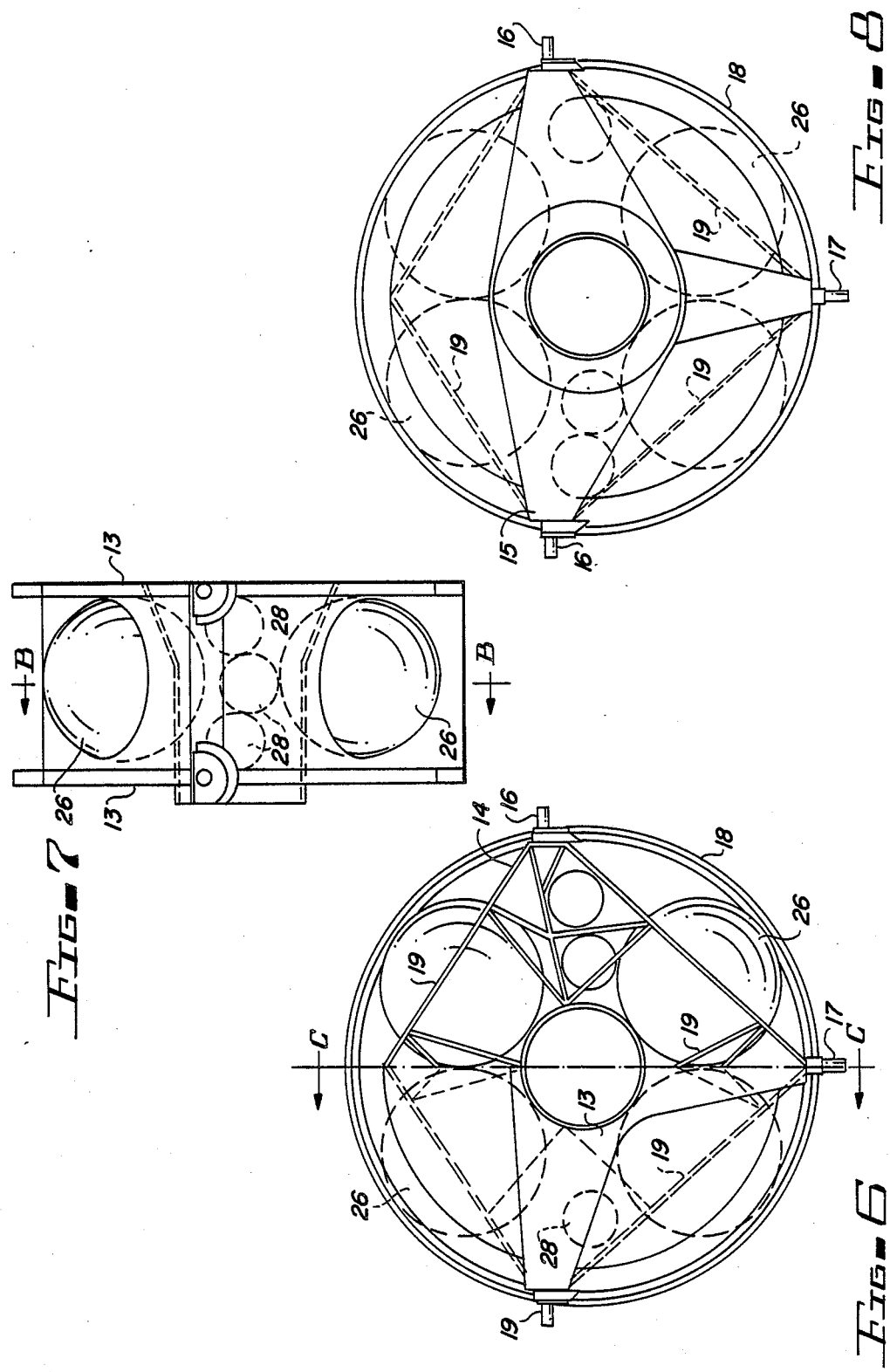

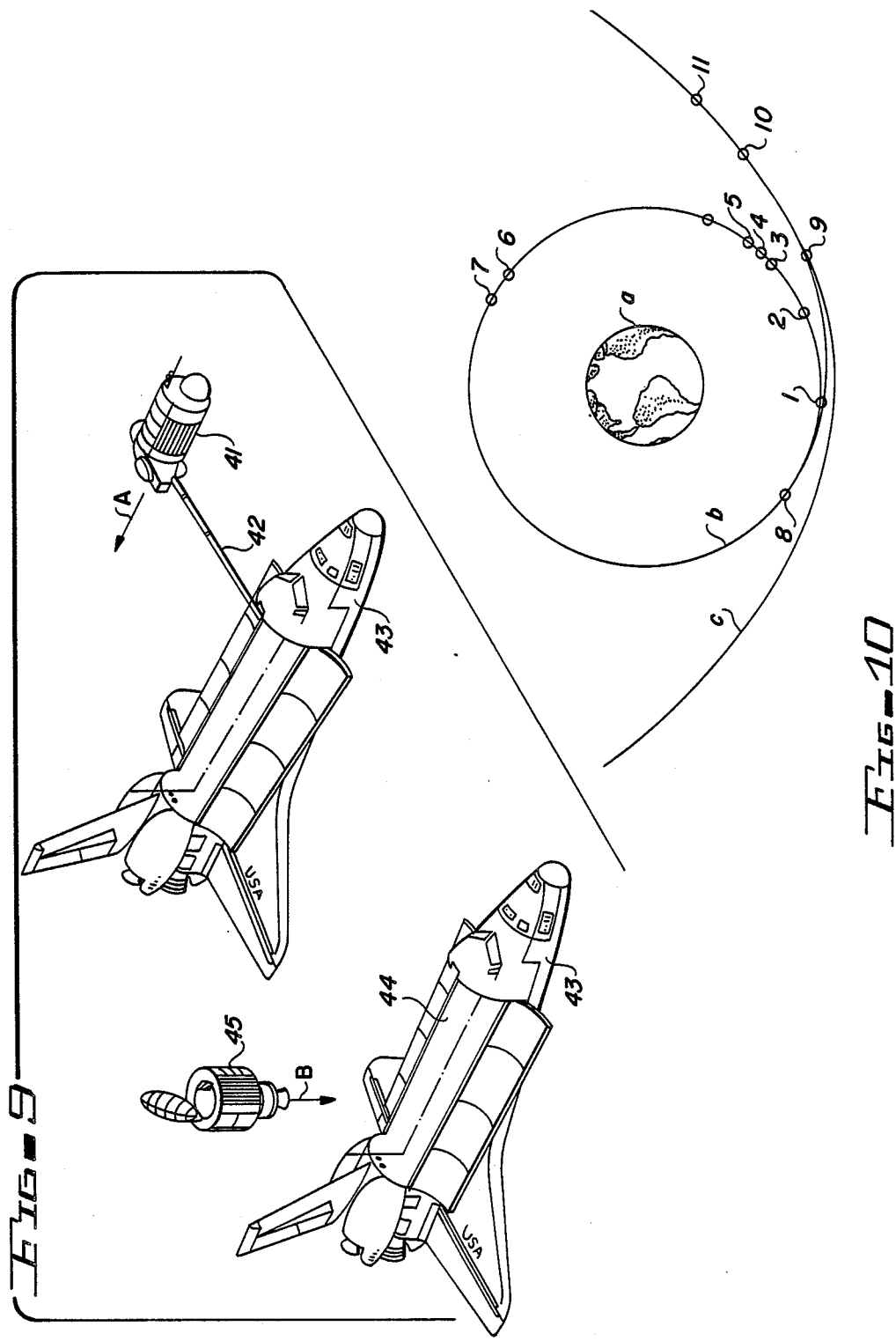

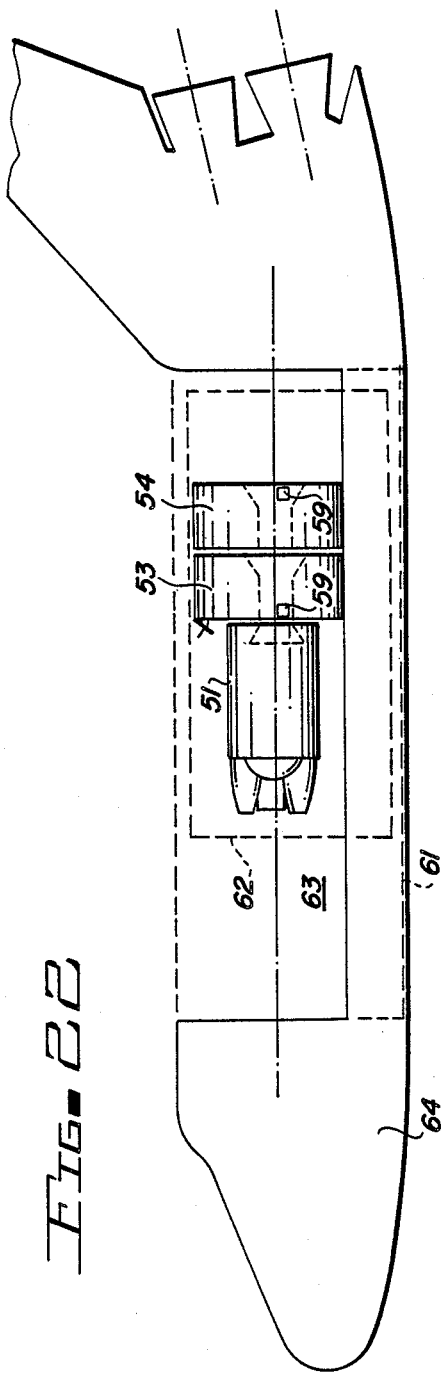
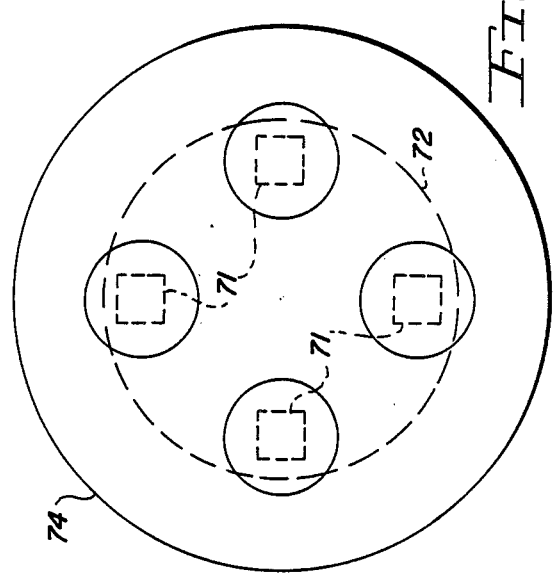
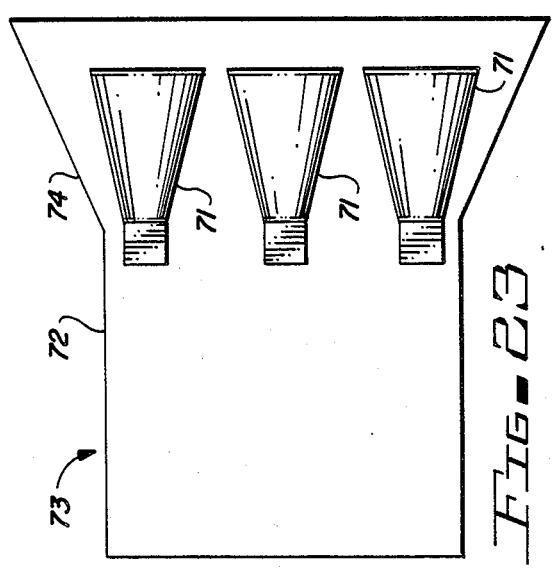

SATELITE TRANSFER VEHICLE

RELATED APPLICATIONS

This application is a continuation in part of U.S. application Ser. No. 645,911 filed Aug. 29, 1984, now issued U.S. Pat. No. 4,664,343 issued May 12, 1987 for "Satellite Transfer Vehicle".

TECHNICAL FIELD

This invention relates to a vehicle for transferring payloads from an earth-launch vehicle in one trajectory to another trajectory.

In another respect the invention concerns such a vehicle which, without major changes in structural propulsion or electrical/avionics subsystems, can deploy either single or multiple payloads.

In yet another aspect the invention concerns a dual-mode vehicle for transferring either single or dual satelite payloads from the Low-Earth-Orbit (LEO) of the Space Transportation System (STS) into a higher Geostationary Orbit (GEO).

In still another respect the invention concerns a multi-stage vehicle for transferring payloads from an earth-launch vehicle in one trajectory to another trajectory.

In still another and further aspect the invention concerns such vehicles which can deploy either single or multiple payloads, which can function in such dual mode and which may comprise a multi-stage arrangement, in which each vehicle or stage thereof is provided with multiple propulsion engines.

BACKGROUND ART

In recent years numerous earth satelites have been placed in earth orbit for both civil and military purposes, e.g., communications, surveillance, scientific investigations, etc. Initially these satelites were placed in orbit by multi-stage conventional liquid or solid fuel rockets, the upper stage of which functioned to transfer the payload from an initial orbit achieved by the first stages of the rocket into another orbit of different shape or distance from the earth. These final stage or orbit "transfer" stages have achieved high states of development and reliability. However, significant economic and other practical problems are encountered in the use of such present technology because of the primary fact that each transfer vehicle can only accommodate payloads which are within a fairly narrow weight-size-shape range. Consequently, users of the currently-available range of space technology are constantly faced with the necessity of developing satellite transfer vehicles specifically adapted for orbit placement of payloads when the size or weight (and sometimes the shape) of the payload is changed. This results in multiplication of development and engineering costs, higher production costs and lengthy delays.

More recently, the United States of America has developed and demonstrated the technical and commercial viability of the so-called space shuttle (more officially designated the Space Transportation System or "STS"). This well-known earth-launch vehicle provides, for the first time, a reusable, highly versatile earth-launch which can carry a wide variety of payloads into LEO and which can then be deployed from the cargo bay of the STS and re-launched or "transferred" from LEO to another orbit utilizing a separate vehicle carried with the payloads in the cargo bay to accomplish the transfer. The most familiar of such transfer vehicles are the so-called "PAM" (payload assist module) vehicles which were adapted for use with the STS from vehicles which formerly served this function in connection with unmanned "Delta" rockets. However, although PAM vehicles have been successfully employed in conjunction with transferring payloads from the LEO of the STS into GEO, there are still significant practical economic limitations on their use with certain current and technologically predictable payloads which are both larger (heavier) than and smaller (lighter) than the payloads for which the modified PAMs were developed.

Thus, in general, according to the current approach for transferring a satelite or other payload from an earth-launch vehicle in one trajectory to another trajectory, the major orbital maneuvers are provided by separate systems, i.e., a separate "upper stage" propulsion vehicle to transfer the spacecraft to apogee and the payload spacecraft which is provided with its own propulsion system for apogee maneuvers to insert the spacecraft into an operational orbit after it has been transferred from the low-earth parking orbit of the earth-launch vehicle. Typically, the upper stage vehicle is expendable and furnished as a separate unit from the spacecraft and must be integrated with the spacecraft to form the "payload" of the earth-launch vehicle.

INDUSTRIAL APPLICABILITY

The invention provides a satelite transfer vehicle or payload transfer vehicle which can transfer at least a pair of relatively smaller payloads or satelites from the trajectory of an earth-launch vehicle to another trajectory and, accommodates either a single larger (heavier) payload or two smaller (lighter) payloads without major changes in the structure and other on-board systems such as propulsion, electronics/avionics, etc.

The invention also provides a dual-mode STV which is specially adapted for use with the STS, thus achieving utility over a wider range of payload weights or sizes and providing the capability for return to earth in the shuttle cargo bay in the event deployment of the payload(s) is aborted for any reason.

Further, the invention also provides for incorporating all of the major orbital maneuvers involved in transferring the payload of an earth-launch vehicle from the trajectory of the earth-launch vehicle to another vehicle by a single stage satelite transfer vehicle. These maneuvers include the transfer from low earth orbit, the insertion into the final operational orbit and attitude control until the spacecraft has completed initial on-orbit checkout.

The invention also provides an STV which is provided with a plurality of propulsion engines which, in turn, provides a wider range of payloads and other operational flexibilities.

Finally, the invention provides an STV which is recoverable and, after refurbishment, reusable.

With these capabilities a satelite user can purchase an integrated delivery and checkout service as opposed to the purchase of several separate hardware systems and subsystems which must be incorporated and/or integrated with the spacecraft and subsequently disposed of or carried as deadweight.

The invention also provides the capability for recovering the STV from geostationary orbit or other trajectory after separation of the payload by maneuvers which return the STV to the low earth orbit of a returnable earth-launch vehicle such as the STS. According to this feature, the STV is maneuvered to the general proximity of the STS and the STS, using the RMS stows the STV in the STS cargo bay for return to earth and for refurbishing and reuse.

The invention also provides the capability of on-orbit refueling and/or repair or modification of the STV for additional or different missions by effecting black box replacements or substitutions in the STV systems by shuttle astronauts, either in or in proximity to the STS.

BRIEF DESCRIPTION OF DRAWINGS

FIG. 1 is an exploded perspective view of an STV constructed in accordance with the preferred practice of the present invention;

FIG. 2 is a partially cut-away perspective view of the forward end and sides of the engine module of the vehicle of FIG. 1;

FIG. 3 is a view of the aft end of the engine module of FIG. 2;

FIG. 4 is a half sectional view of the engine module of FIG. 3 taken along section line A—A thereof;

FIG. 5 is a sectional view of the assembled STV of FIG. 1;

FIG. 6 is a half sectional view of the STV of FIG. 5 taken along section line B—B thereof;

FIG. 7 is a cut-away sectional view of the engine module of FIG. 6 taken along section line C—C thereof;

FIG. 8 is a rear view of the engine module of the STV of FIG. 5 showing major components of the propulsion and reaction control systems and some structural details in dashed lines;

FIG. 9 is a comparison of the deployment attitudes of the PAM and the STV of the present invention from the STS;

FIG. 10 depicts a typical mission scenario for the deployment of a single payload by a combination of the STS and the STV of the present invention;

FIG. 22 is a partially cut-away schematic view illustrating of the two-stage STV-payload of FIG. 21 in the cargo bay of the STS;

FIGS. 23 and 23(a) are, respectively, side and rear end illustrations of an STV showing the use of four smaller propulsion engines rather than the single engine configuration depicted in FIGS. 1-8.

DESCRIPTION OF THE INVENTION

Figure 11:
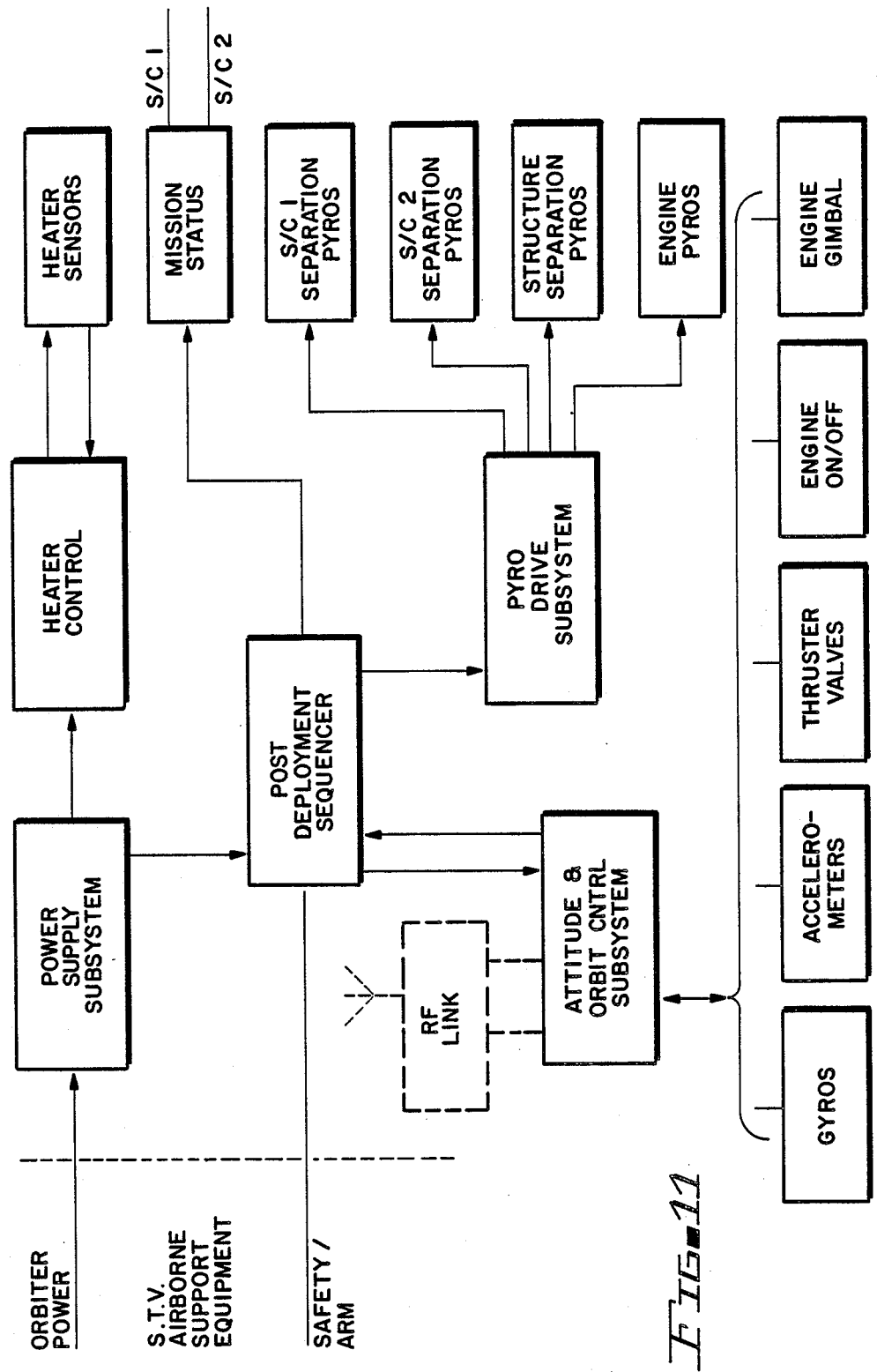
FIG. 11 is a flowchart illustrating the relationship and functioning of various major subsystems of the expendable engine module of the STV of FIG. 1.

Briefly, in accordance with the invention, we provide a vehicle for transferring multiple payloads from an earth-launch vehicle in one trajectory to another trajectory. The transfer vehicle comprises an engine module, means for detachably mounting a first payload on and forwardly of the support frame of said engine module, a forwardly extending carrier member for carrying a second payload in tandem forwardly of the first payload and means for sequentially detaching the second payload from the carrier member, the carrier member from the engine module support frame and the first payload from the support frame.

The engine module includes a support frame shaped, dimensioned and adapted to be carried by the earth-launch vehicle. The support frame, in turn, carries on-board mission equipment, including a rocket engine, related fuel supply, ignition and control equipment and electrical power supply equipment. The rocket engine is enclosed by and carried in a central thrust cylinder which includes a thrust cone directed rearwardly of the support frame. The vehicle-attitude control equipment includes a reaction control system and related fuel supply and control equipment.

The carrier member for the second payload is shaped and dimensioned to enclose and extend forwardly of the first payload which is carried on the engine module support frame. The carrier member is detachably secured at its rear portion to the support frame and carries on its forward portion means for detachably securing a second payload. The carrier member functions to transmit cantilever and linear loads directly between the support frame of the engine module and the second payload, to insulate the payload from such loads.

Best Modes for Carrying Out the Invention

In accordance with a presently preferred embodiment of the invention, the transfer vehicle described above has a dual-mode capability, i.e., a first mode for transferring a single relatively heavier payload from the trajectory of the earth-launch vehicle to another trajectory and a second mode in which the vehicle transfers two, relatively lighter payloads from the trajectory of the earth-launch vehicle to at least one other trajectory. In this embodiment, the dual-mode vehicle includes the engine module described above in which the rocket engine and fuel supply elements are sized to accomplish payload transfer(s) in either of the two modes. The carrier member, when used in accordance with the second "dual payload" mode and the dual payloads are configured in this embodiment to be mounted and carried upon the engine module without substantially changing the center of gravity of the resultant vehicle in the second mode of operation from the center of gravity of the engine module and single payload utilized in the first "single mode" of operation.

In the further and more specifically preferred embodiment of the invention, the transfer vehicle is either the dual-mode vehicle described above or a multistage vehicle, further described below. The earth-launch vehicle which is employed with the transfer vehicle includes a primary guidance system, a fuselage with a normally closed elongate cargo bay extending along the longitudinal axis of the fuselage, a cargo bay door for temporarily opening the bay to the exterior of the fuselage and a plurality of trunnion cheeks for supporting payloads within the bay. Primary propulsion engines are carried rearwardly of the fuselage for launching the earth-launch vehicle and the transfer vehicle from the earth into the low-earth-orbit. The fuselage also includes a remote manipulation system operatively associated therewith for selectively grappling payloads in the cargo bay, removing the loads therefrom and deploying the loads outside the earth-launch vehicle. The cargo bay thus defines a dimensional envelope and a mass-distribution envelope for the payloads positioned therein. The earth-launch vehicle also includes means for nondescructibly returning the earth-launch vehicle from low-earth-orbit to the earth for reuse.

According to a first variation of this preferred embodiment, the dual-mode transfer vehicle includes an engine module, forwardly extending carrier member and payload(s) which are sized and shaped to be received within the cargo bay of the earth-launch vehicle and which are adapted to be removably secured in the cargo bay during the pre-earth launch, launch and low-earth-orbit phases of the earth-launch vehicle mission. The transfer vehicle further includes means cooperatively engaging the grapple of the earth-launch vehicle for removing the transfer vehicle from the cargo bay and deploying it outside the earth-launch vehicle. Such means for removably securing the transfer vehicle within the cargo bay are also adapted to secure the transfer vehicle in the cargo bay during the earth-return phase of the earth-launch vehicle mission in the event it is necessary to abort payload deployment.

According to a second variation of this preferred embodiment, the multi-stage transfer vehicle includes at least two rocket-powered propulsion stages arranged and releasably secured together in tandem relationship. Each such stage includes a support frame, at least one rocket engine mounted in said frame and the fuel supply for said engine. Means are provided for releasably mounting a payload on the upper end of said tandem propulsion engines. Avionics and post-deployment support systems for the multi-stage vehicle are carried in the support frame of the upper propulsion stage. Trunnions, formed integrally with the support frame of at least one of the propulsion stages, directly, releasably support and position the multi-stage vehicle/payload on the trunnion cheeks within the dimensional and mass-distribution envelopes of the cargo bay.

DETAILED DESCRIPTION OF THE DRAWINGS

Turning now to the drawings, in which the reference numerals denote like elements in the several figures, FIGS. 1-8 depict a satelite transfer vehicle constructed in accordance with one embodiment of the invention. The satelite transfer vehicle includes an engine module generally indicated by reference numeral 10, a forwardly extending carrier member, generally indicated by reference numeral 11, comprised by a cylindrical portion 11a and a conical extension 11b. In use, in accordance with a presently preferred embodiment of the invention configured to accommodate the transfer of dual payloads from LEO to GEO, the vehicle carries a first payload satelite 12a on the forward portion 13 of the support frame of the engine module 10 and a second satelite payload 12b carried on the load support ring 14 formed at the forward terminus 14 of the conical portion 11b of the forwardly extending carrier member 11. The forward portion 13 of the engine module support frame and the rear portion 15 thereof carry lateral trunnion members 16 and keel trunnions 17 which are shaped and spaced to be cooperatively engaged by load securing and carrying cheek blocks in the cargo bay of an STS or similar earth-launch vehicle. The support frame 13-15 of the engine module is enclosed in a composite outer skin 18 and carries suitable internal support struts 19 as well as shear panels 21, torsion panels 22, all such components forming an integral support frame, shaped, dimensioned and adapted to be carried by the earth-launch vehicle.

On-board mission equipment carried by the support frame of the engine module includes a rocket engine 23 carried in a central thrust cylinder 24 which terminates in a trust cone 25 directed rearwardly of the engine module 10. The on-board mission equipment carried by the support frame also includes engine liquid fuel supply tanks 26 and vehicle-attitude control equipment including reaction control system thrusters 27 (for pitch/yaw control) and related thrust fuel supply containers 28 and fuel system pressurant tanks 29.

Other on-board mission equipment (omitted for clarity of illustration) will, as well-known to those skilled in the art, include guidance equipment, electrical power supply equipment and suitable means (e.g., explosive bolts) for detachably securing the first payload 12a to the forward portion 13 of the support frame of the engine module 10.

The forwardly extending carrier member 11 (FIG. 1) is shaped and adapted to carry the second payload 12b in tandem forwardly of the first payload 12a. As shown, the cylindrical portion 11a and conical portion 11b are shaped and dimensioned to enclose the first payload 12a. The forward terminus 14 of the conical portion 11b of the carrier member 11 carries suitable means (e.g., explosive bolts) for detachably securing the second payload 12b thereto. In the assembled relation shown in FIG. 5, cantilever and linear loads are transmitted by the carrier member 11 directly between the support frame of the engine module 10 and the second payload 12b. For convenience, mating flanges 31 and 32 formed respectively in the forward and rear ends of the cylindrical portion 11a and the conical portion 11b of the carrier member 11 are releasably secured by any convenient means, e.g., by so-called "super zip".

Suitable control means are also carried by the engine module for sequentially detaching the second payload from the carrier member, detaching the carrier member from the support frame (which may include separation of the cylindrical portions 11a and conical portions 11b) and, finally, detaching the first payload from the support frame of the engine module 10, such control means being well-known to those skilled in the art.

Finally, as shown in FIG. 1, a grapple fixture 33 is provided, suitably located on the conical portion 11b of the forwardly extending carrier member 11 which cooperates with the remote manipulation system (RMS) of an earth-launch vehicle such as the STS to permit removal of the STV from the cargo bay and deployment thereof outside the earth-launch vehicle.

As shown in FIG. 9, deployment of the STV 41 by the RMS 42 of the STS 43 positions the STV 41 in such manner that premature motor/engine ignition of the STV causes the exhaust plume indicated by the reference character A to be directed parallel to and rearwardly of the STS 43. By comparison, this is a much safer deployment scenario than provided by current "PAM"-type transfer vehicles 45 which, as illustrated in FIG. 9, are indirectly deployed from the cargo bay 44 of the STS 43 (by springs or other mechanical means) in such manner that premature motor/engine ignition would be directed toward the STS as indicated by the arrow B. The difference in safety aspects of the two deployment modes illustrated in FIG. 9 will be obvious to those skilled in the art.

FIG. 10 illustrates a mission scenario for the STS/STV combination through payload deployment and attainment of geostationary transfer orbit. For purposes of illustration, the STV is assumed to be operating in the single-stage, single-payload mode. Reference character "a" indicates the earth, reference character "b" indicates the STS parking orbit and reference character "c" indicates the geostationary transfer orbit. The various action points in the mission scenario are:
1—orbitor assumes deployment attitude
2—RMS attached to STV grapple
3—STV to internal power
4—STV gyros initialized
5—payload mechanisms activated
6—payload lifted from cargo bay and deployed
7—STS maneuvers to safe distance
8—LPE engines fired
9—end of engine burn
10—release attitude acquired
11—spacecraft separation in geostationary transfer orbit Further details and interrelationships of the various systems and subsystems of the STV are depicted for purposes of illustration and not by way of limitation in FIGS. 11–19 which will enable those skilled in the art to understand and practice the invention.

FIG. 11 illustrates the major components and subsystems of the STV, configured for dual payload (S/C) capability.

Figure 12:
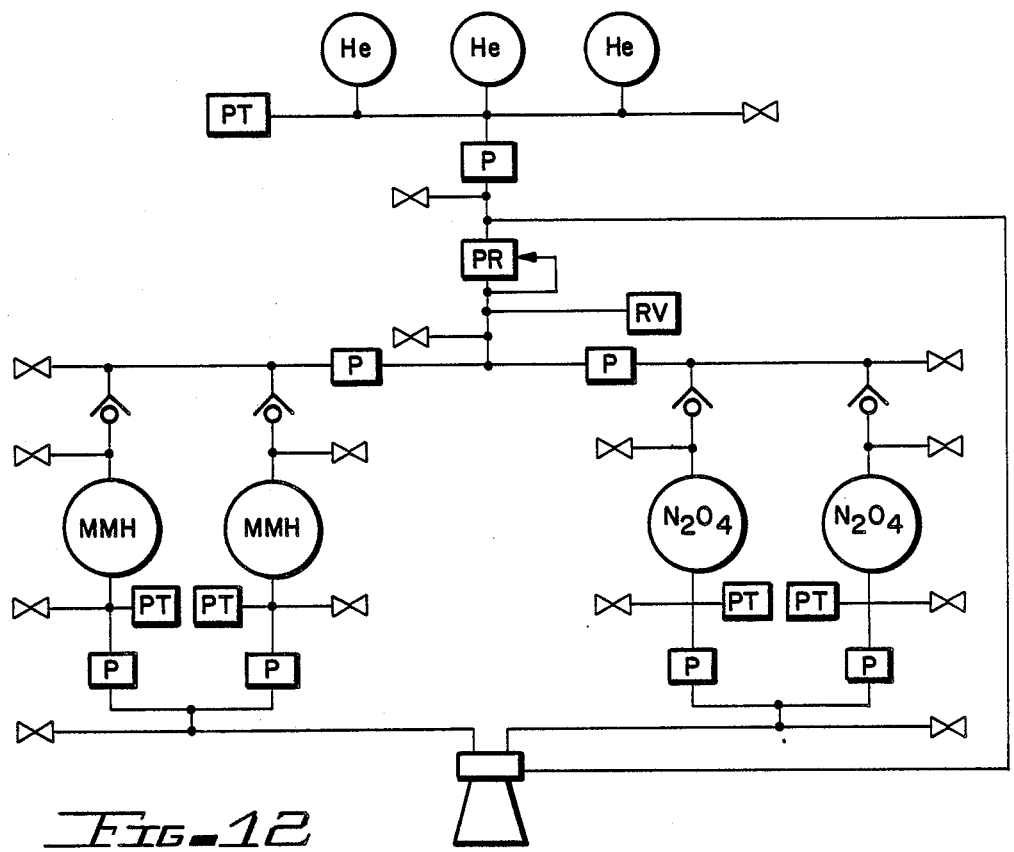
FIG. 12 is a schematic illustrating the primary propulsion subsystem of the engine module of the STV of FIG. 1.
Figure 13:
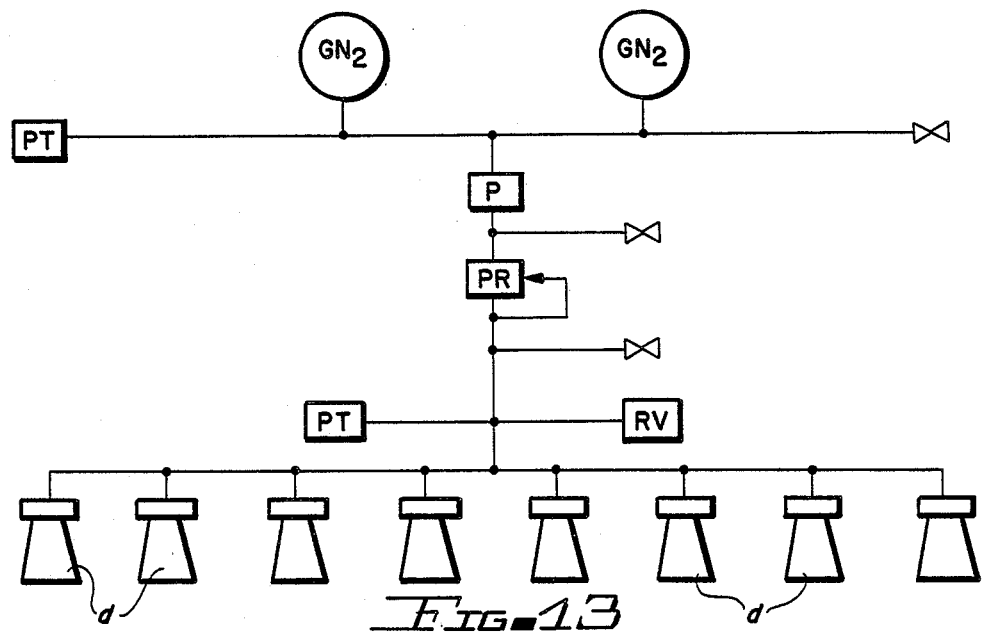
FIG. 13 is a schematic illustrating the reaction control system of the engine module of the STV of FIG. 1.

FIG. 12 illustrates the mechanical subsystems of the primary propulsion subsystem. In FIG. 12 the reference characters have the following meanings:
P—pyrotechnic isolation valve
PT—pressure transducer
PR—pressure regulator
RV—relief valve FIG. 13 illustrates the mechanical subsystems of the reaction control system. In FIG. 13 the reference characters have the same meanings as in FIG. 12 and reference characters "d" indicate the reaction control thrusters.

Figure 14:
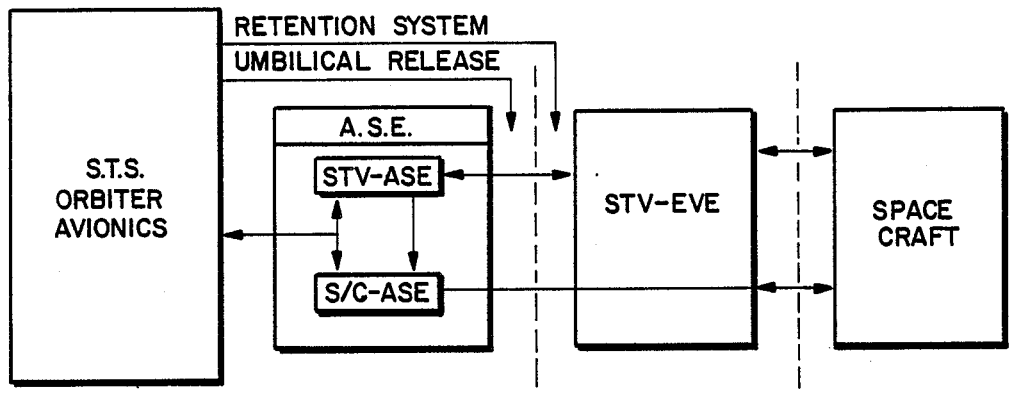
FIG. 14 is a schematic illustrating the relationship of the electrical systems of the STS, the STV motor module and airborne support equipment for the STV engine module and spacecraft.

FIG. 14 illustrates the electrical subsystem.

Figure 15:
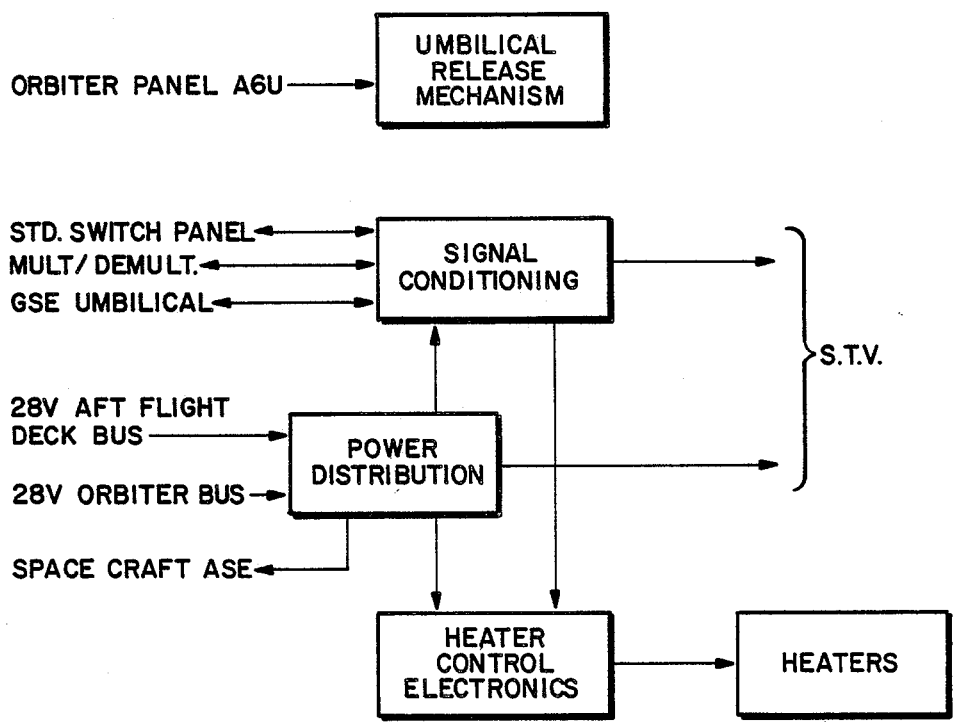
FIG. 15 further depicts details of the airborne support equipment for the engine module of FIG. 14.

FIG. 15 illustrates the airborne support equipment for the STV.

Figure 16:
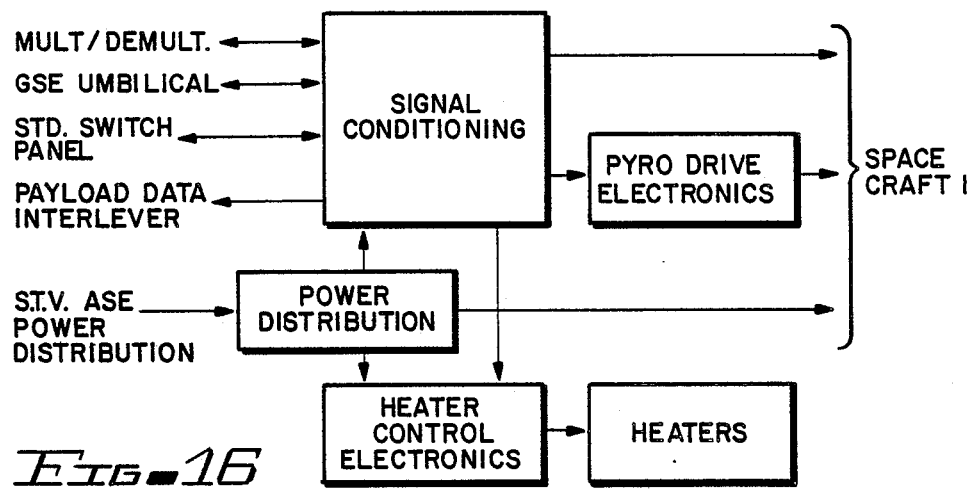
FIG. 16 is a schematic which further illustrates airborne support equipment for the payload of FIG. 14.

FIG. 16 illustrates the airborne support equipment for one of the dual payloads.

Figures 17, 18:
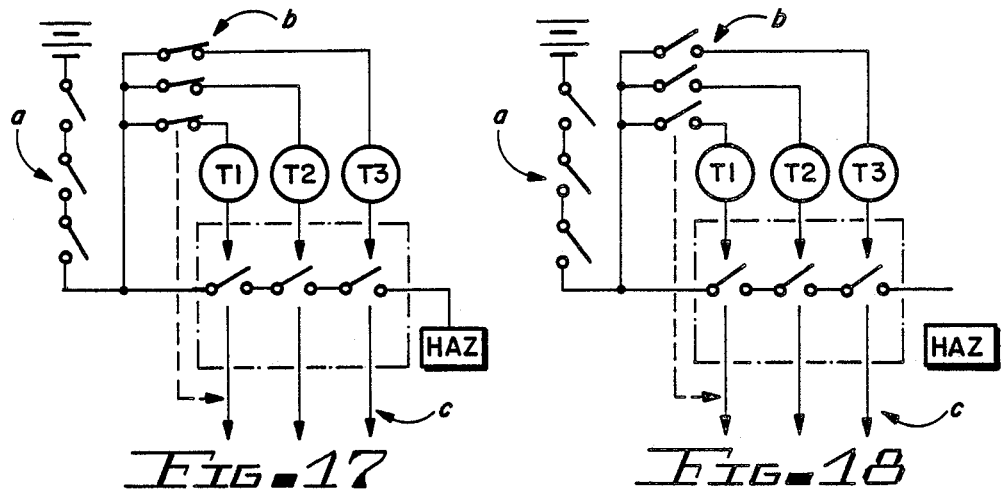
FIG. 17 is a schematic illustrating the safety and launch vehicle interfaces during pre-launch, ascent and LEO.
FIG. 18 illustrates the pre-deployment condition of the interface system of FIG. 17 after RMS attachment.
Figures 19, 20:
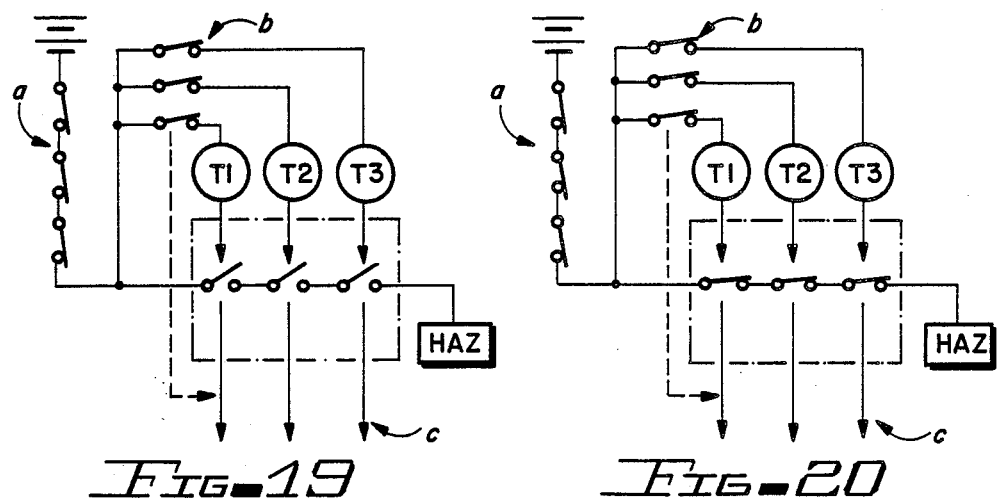
FIG. 19 illustrates the condition of the safety and launch vehicle interface of FIG. 17 after RMS release and PDS activation.
FIG. 20 illustrates the condition of the interface system of FIG. 17 after deployment and prior to primary propulsion system ignition.
Figure 21:
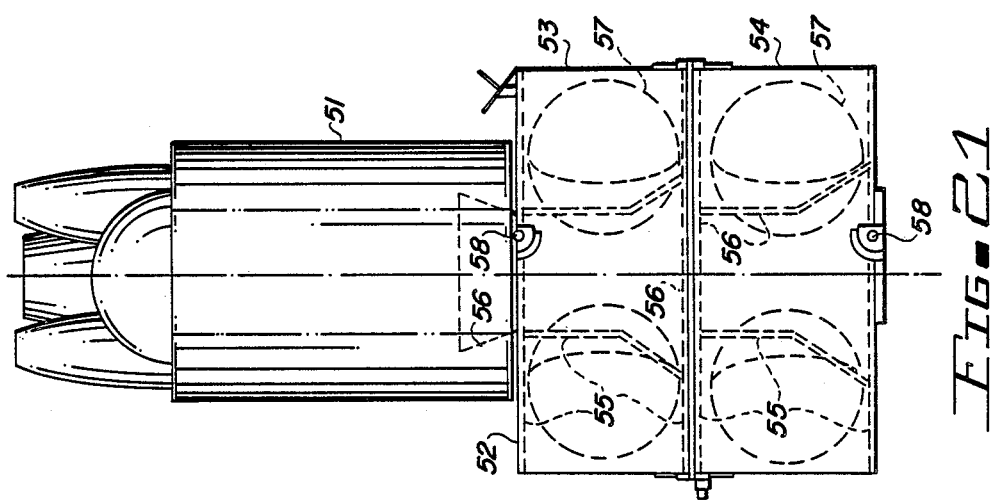
FIG. 21 is a plan view of a two-stage STV for delivery of a single relatively large payload (satelite)

FIGS. 17–20 illustrate the conditions of the safety and launch vehicle interfaces, as follows:
FIG. 17—pre-launch ascent and on-orbit
FIG. 18—pre-deployment with RMS attached
FIG. 19—after deployment and release of RMS with PDS activated
FIG. 20—less than 50 minutes from release to engine firing FIGS. 21 and 22 depict a multi-stage satelite transfer vehicle constructed in accordance with the present invention. This multi-stage vehicle is especially adapted to deploy very large payloads such as, for example, the "TDRS-E/F" 51. This payload is releasably mounted on the upper end 52 of the upper stage 53 which is releasably secured in tandem with lower stage 54. Each of the stages 53 includes a support frame 55 (shown by dashed lines), at least one rocket engine 56 and fuel supply tanks 57. Avionics and post-deployment support systems for the entire vehicle are carried in the support frame 55 of the upper propulsion stage 53. Trunnions 58 are formed integrally with the support frames 55 of at least one of the propulsion stages to directly releasably support and position the STV/payload on the trunnion cheeks 59 which are located within the dimensional envelope 61 and mass-distribution envelope 62 of the cargo bay 63 of the earth-launch vehicle 64.

FIGS. 23 and 23(a) schematically depict an arrangement of a plurality of relatively smaller rocket engines 71 (in this case, four) supported within the central cylinder portion 72 of an engine cluster frame 73 comprising the central cylinder 72 and the exit cone 74. This arrangement, for example, can be used as the alternate to the single-engine propulsion system of the STV illustrated in FIGS. 1–8. By proper selection of the number (two or more) of such smaller engines, the capabilities of the STV can be tailored for varying payload/deployment scenario combinations without the necessity for re-engineering the basic support frame/envelope/fuel system/avionics/support systems package.

The widely varying capabilities of the STV, i.e., single/multiple payload, single/multiple stage, single/multiple engines, expendible/recoverable modes, earth returnable/on-orbit repairable/modifiable, provide the industry with a variety of unique advantages. The STV/payload combination can be directly mounted in the STS payload bay rather than by use of a conventional mounting cradle. Multiple satelites can be launched by one STV, one very large satelite can be launched with staged STVs, smaller engines such as the Marquardt R-40 which are already used as STS RCS engines can be employed in single or multiple engine configurations. In addition, considerable performance versatility is realized such as multiple burns, multiple parigee maneuvers, apogee maneuvers, evasive maneuvers, return or de-orbit maneuvers and prelaunch checkout burns.

Figure 24:
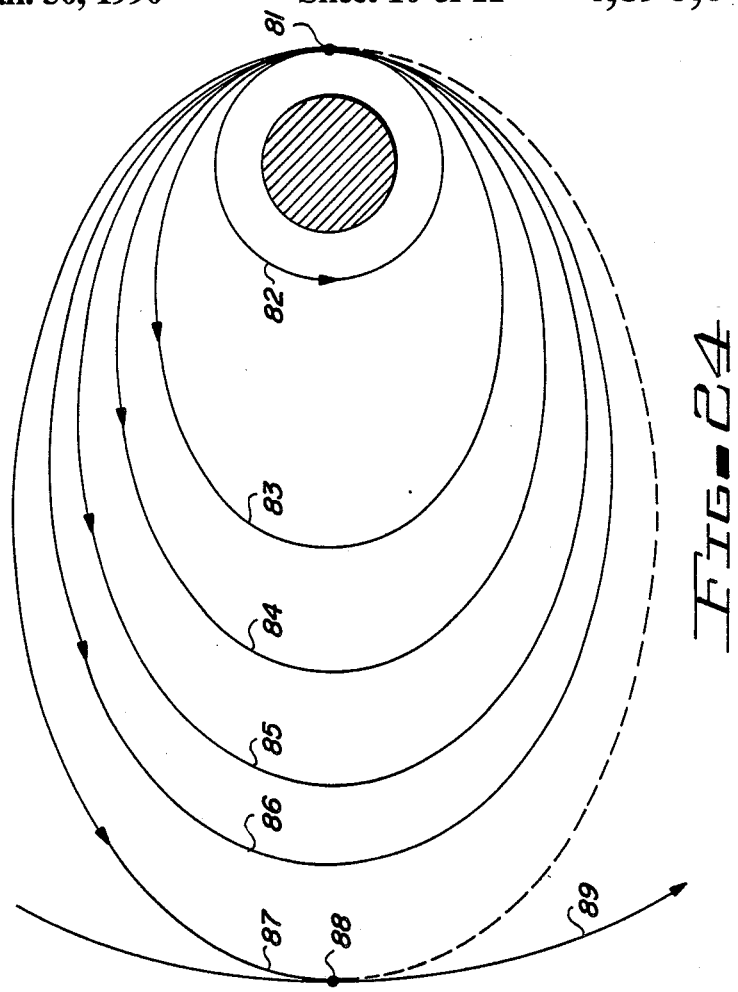
FIG. 24 depicts a mission scenario utilizing the STV to transfer a payload from the parking orbit of an earth-launch vehicle by multiple turns, through intermediate transfer orbits to geosynchronous orbit.

For example, FIG. 24 illustrates a multiple maneuver transfer scenario which can be performed by the STV which consists of a plurality of parigee burns 81 which moves the STV/payload from the low-earth parking orbit 82 through successively higher intermediate transfer orbits 83, 84, 85 and 86 into a final geosynchronous transfer orbit 87 where an apogee burn 88 is chronous transfer orbit 87 where an apogee burn 88 is performed to place the payload in geosynchronous orbit 89.

We claim:
1. In a system for transferring a payload from an earth-launch vehicle in one space trajectory to another trajectory, said system including
an earth-launch vehicle, having
fuselage means including a cargo bay defining a mass-distribution envelope therein, and primary propulsion and guidance systems for launching said earth-launching vehicle from earth for injection into a low-earth transfer trajectory;

a transfer vehicle carrying said payload, stowed in said cargo bay during earth-launch and insertion of said earth-launch vehicle into said low-earth transfer trajectory; and means for un-stowing said transfer vehicle/payload combination from said cargo bay preparatory to operation of said transfer vehicle to transfer said payload to said other trajectory;

the improved transfer vehicle characterized in that the improved transfer vehicle has multiple stages, including, in combination:

(A) at least two rocket-powered propulsion stages arranged and releasably secured together in tandem relationship, each said stage including
 (1) a support frame,
 (2) at least one rocket engine mounted in said frame; and
 (3) the fuel supply for said engine;
(B) means for releasably mounting a payload on the upper end of said tandem propulsion stages;
(C) avionics and post-deployment support systems for said vehicle carried in the support frame of the upper propulsion stage; and
(D) trunnion-cheek means formed integrally with the support frame of at least one of said propulsion stages and said fuselage means to directly, releasably support and position said vehicle and attached payload within the dimensional and mass-distribution envelopes of said cargo bay.

* * * * *